US 8,407,977 B2

(12) United States Patent
Cheng et al.

(10) Patent No.: US 8,407,977 B2
(45) Date of Patent: Apr. 2, 2013

(54) OVAL STEEL CORD WITH OVAL WIRES

(75) Inventors: Zhichao Cheng, Jiangyin (CN);
Hongzhen Zhu, Jiangyin (CN); Hao Zhou, Jiangyin (CN); Huanjiong Pang, Jiangyin (CN); Junhua Kan, Jiangyin (CN)

(73) Assignee: NV Bekaert SA, Zwevegem (BE)

( * ) Notice: Subject to any disclaimer, the term of this patent is extended or adjusted under 35 U.S.C. 154(b) by 0 days.

(21) Appl. No.: 13/395,249

(22) PCT Filed: Aug. 10, 2010

(86) PCT No.: PCT/EP2010/061591
§ 371 (c)(1),
(2), (4) Date: Mar. 9, 2012

(87) PCT Pub. No.: WO2011/029679
PCT Pub. Date: Mar. 17, 2011

(65) Prior Publication Data
US 2012/0177940 A1    Jul. 12, 2012

(30) Foreign Application Priority Data
Sep. 11, 2009 (EP) ..................................... 09170048

(51) Int. Cl.
*D02G 3/48* (2006.01)
(52) U.S. Cl. ......................................................... 57/212
(58) Field of Classification Search ................ 57/212, 57/223
See application file for complete search history.

(56) References Cited

U.S. PATENT DOCUMENTS

| 3,778,993 | A | * | 12/1973 | Glushko et al. ................. 57/215 |
| 4,349,063 | A | * | 9/1982 | Kikuchi et al. ................ 152/527 |
| 4,709,544 | A | * | 12/1987 | Charvet .......................... 57/218 |
| 5,206,333 | A | | 4/1993 | Sue et al. |
| 5,240,772 | A | * | 8/1993 | Henning ......................... 428/400 |
| 5,418,333 | A | * | 5/1995 | Sanders ..................... 174/129 R |
| 5,802,830 | A | * | 9/1998 | Kawatani ......................... 57/212 |
| 6,658,836 | B2 | * | 12/2003 | Nguyen et al. ................... 57/218 |
| 7,928,151 | B2 | | 4/2011 | Oniyanagi et al. |
| 8,191,348 | B2 | * | 6/2012 | Barguet et al. .................. 57/223 |
| 2002/0174645 | A1 | * | 11/2002 | Nguyen et al. .................. 57/213 |
| 2009/0101266 | A1 | * | 4/2009 | Barguet et al. ................ 152/527 |
| 2011/0290397 | A1 | * | 12/2011 | Rodriguez et al. ............ 152/526 |

FOREIGN PATENT DOCUMENTS

| JP | 1-266939 A | 10/1989 |
| JP | 4-331223 A | 11/1992 |
| JP | 7-197388 A | 8/1995 |
| JP | 9-268485 A | 10/1997 |
| JP | 2007-275988 A | 10/2007 |
| WO | WO 93/01375 A1 | 1/1993 |

* cited by examiner

*Primary Examiner* — Shaun R Hurley
(74) *Attorney, Agent, or Firm* — Foley & Lardner LLP

(57) ABSTRACT

A steel cord used for reinforcing rubber product with an oval cross-section has a structure of m+n, while m is the number of core wires (26) and n is the number of the outer layer wires (22). The core wire (26) is untwisted while m is 1 or the core wires (26) are untwisted and aligned in parallel while m is between 2 and 4, and the outer layer wires (22) are twisted around said core wires (26). The core wires (26) are oval wires and the outer layer wires (22) are round wires. The wires (22, 26) in the steel cord have a carbon content not less than 0.60%.

14 Claims, 2 Drawing Sheets

OVAL STEEL CORD WITH OVAL WIRES

TECHNICAL FIELD

The present invention relates to a steel cord with an oval cross-section used for reinforcing rubber product.

BACKGROUND ART

The steel cord with an oval cross-section comprising a core and an outer layer has an advantage on stiffness than the steel cord with the round cross-section. There will be different stiffness in the different direction of the oval steel cord, and this character will lead to a good handling, riding comfort or driving stability when such oval steel cord is used for reinforcing rubber tyre. In a direction perpendicular to the long axis of the oval steel cord, there is a decreased stiffness and an increased flexibility so that any obstacles such as cobble stones on the road can be taken easily. In the direction of the long axis of the oval steel cord, there is an increased stiffness and a decreased flexibility leading to an improved stability when taking a bend. Additionally the rubber ply reinforced by the steel cord with an oval cross-section will be thinner than that reinforced by the steel cord with a round cross-section.

Usually, to get such a steel cord with an oval cross-section, the flat wire is used as the core in the steel cord.

EP 0264145 discloses a steel cord with an elongation cross-section comprising a flat wire as the core. The flat wire has a ratio of breadth and the thickness of at least 2. It is a drawback that the flat wire will have a mechanical property loss, e.g. loss of fatigue resistance and less tensile strength, during the manufacturing. The way of manufacturing the flat wire is by means of cold drawing the round wire through a forming profile die or by means of cold rolling. Then the cross-section of the steel wire will be changed from round to flat. Due to the stress-concentration on the four angles of the flat wire, the mechanical properties of the steel wire will loose a lot during the forming process from round to flat. The weak fatigue resistance of the final flat steel wire will take a disadvantage to the final steel cord.

Another way for producing a steel cord with oval cross-section is that arranging the round steel wires based on the geometrical characters of oval, e.g. JP-A-09-268485. The drawbacks are that the ply reinforced by such steel cord is still very thick, the process of manufacturing the steel cord is not very easy to operate, and the producing cost is very high.

WO 93/01375 discloses a steel rope used for reinforcing concrete constructions. The steel rope has an oval cross-section with an oval wire as core. Due to the high elongation of the steel rope and the requirement of the stiffness for reinforcing concrete, the diameter of the steel wire in the rope should be large, larger than 1 mm or even larger than 10 mm. And the carbon content of the steel wire is low, even lower than 0.2%. And steel wires are not provided with a metallic coating such as brass. The patent application document discloses that a steel rope with such structure can be used for reinforcing concrete construction. Due to low carbon content and big diameter, the steel rope does not adapt for reinforcing rubber product.

DISCLOSURE OF INVENTION

It is an object of the present invention to overcome the drawbacks of the prior arts.

It is also an object of the present invention to provide a steel cord with different stiffness in different direction.

It is a further object of the present invention to provide a rubber product reinforced by the steel cord.

According to the present invention, the steel cord with an oval cross-section for reinforcing rubber products has a structure of m+n, and m is the number of the core wires and it ranges from 1 to 4, and n is the number of the outer layer wires and it ranges from 4 to 15, and the core wire is untwisted while m is 1 or the core wires are untwisted and aligned in parallel while m is between 2 and 4, the outer layer wires are twisted around the core wires, and the wire in core has a oval cross-section while the wire in outer layer has a round cross-section. The wires in the steel cord have carbon content not less than 0.60%.

To obtain a steel cord having the different stiffness in the different direction, the steel cord is made into an oval steel cord. 'Oval steel cord' refers to a steel cord having an oval cross-section with a major axis and a minor axis, and the major axis is longer than the minor axis. The 'major axis' refers to the longest diameter of the oval, and the 'minor axis' refers to the shortest diameter of the oval. Both major axis and minor axis are measured according to the line that runs through the centre and both foci while its ends being at the points of the shape.

According to the present invention, the oval steel cord is compact. The central of the steel cord is filled with core wire(s). There is little space left purposely to fill with rubber which is quite different from the patent publication JP 07-197388 A. To the patent publication JP 07-197388 A, there is a space left in the central of the steel cord to fill with rubber. To the present invention, there is little space in the central of the steel cord. To fill the rubber into the central of the steel cord is not the main purpose of the present invention.

The oval steel cord has a structure of m+n, and m is the number of the core wire(s) while n is the number of the outer layer wires. To get such an oval steel cord, the core wires are oval wires and the outer layer wires are round wires. Furthermore to make the minor axis of the oval steel cord shorter, the core wire is untwisted while m is 1 or the core wires are untwisted and aligned in parallel while m is between 2 and 4, the outer layer wires are twisted around the core wires.

The core wires are oval wires. 'Oval' wire is different from 'flat' wire. 'Oval' refers to ellipse with a smooth closed curve, and it has a major axis and a minor axis while the major axis is longer than the minor axis. 'Flat' means a two parallel linear lines and two rounded lines at the edges. This cross-section of a flat wire is totally different from an oval cross-section. Due to the stress-concentration on the four angles of the flat wire, the mechanical properties of the steel wire will loose a lot during the forming process from round to flat. The weak fatigue resistance of the final steel wire will take a disadvantage to the final steel cord. But the oval steel wire has no such problem. The stress-concentration of the oval wire is smaller than the flat wire during the manufacturing process for the transformation from round to oval is smoother than it from round to flat, thus the final oval steel wire has better mechanical properties than flat wire, i.e. fatigue resistance.

What is true for a flat wire is even truer for a wire with a rectangular cross-section. This cross-section has two parallel long lines and two parallel short lines. The stress concentration in the four angles of the cross-section is even more pronounced than is the case with a flat wire.

To the core wire, it has an oval cross-section with a major axis and minor axis, and the ratio $R_{ax}$ of the major axis and minor axis satisfies the following expression:

$$1.00 < R_{ax} \leq 2.50$$

Preferably $R_{ax}$ ranges from 1.05 to 1.50.

The major axis of the oval steel wire is smaller than 1 mm. Preferably the major axis of the oval steel wire ranges from 0.10 mm to 0.60 mm. Most preferably the major axis of the oval steel wire ranges from 0.30 mm to 0.45 mm.

The outer layer wires are round wires. 'Round' means a circle curve. For reinforcing the rubber product, the outer layer wires have a small diameter. The diameter of the outer layer wire is smaller than 1 mm. Preferably the diameter of the outer layer wire ranges from 0.10 mm to 0.60 mm. Most preferably the diameter of the outer layer wire ranges from 0.20 mm to 0.40 mm.

To obtain a stable structure, the number of the oval core wires m ranges from 1 to 4, preferably m ranges from 1 to 2, and most preferably m is 1. The number of the outer layer wires n depends on the number of the core wires, the major axis and the minor axis of the core wires, the oval structure of the final steel cord and the diameter of the outer layer wires. Preferably n ranges from 4 to 15. Most preferably n ranges from 5 to 10.

Preferably the structure of the steel cord is 1+6 or 2+8.

The steel wires in the cord including the core wires and the outer layer wires may be bare wires without any coating or coated wires. Preferably, to improve the adhesion with rubber of the oval steel cord, the wires are coated wires which are coated with brass, i.e. copper, and zinc or with any other metal alloy coating promoting the adhesion with rubber. Corrosion resistant coatings may also be provided. Such a corrosion resistant coating can be a zinc aluminum coating with an aluminum content ranging from 2 percent by weight to 12 percent by weight.

Furthermore, the steel wires including the core wires and the outer layer wires may be provided with an adhesion promoting agent to further improve the adhesion with the rubber. In order to allow the steel cord to reinforce the rubber product, it is necessary for the steel cord to be firmly embedded in the rubber material. In other words, it is necessary to improve the adhesion strength of the steel cord. A way to get high adhesion strength is that performing an organo functional silane coating upon the brass coating. The organo functional silane has the following formula:

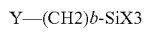

Y—(CH2)$_b$-SiX3

Wherein:

Y represents an organo functional group selected from —NH2, CH2=CH—, CH2=C(CH3)COO—, 2,2-epoxypropoxy, HS—, and Cl—;

X represents a silicon functional group selected from —OR, —OC(=O)R', —Cl wherein R and R' are independently selected from C1 to C4 alkyl, preferably —CH3, and —C2H5; and b is an integer between 0 and 10, preferably from 0 to 3.

The steel cord can be used for reinforcing rubber product such as conveyor belt and rubber tyre.

The oval steel cord has different stiffness in the different direction. The stiffness along the major axis of the steel cord is greater than the stiffness along the minor axis. When such steel cord is embedded in the rubber material as the belt of rubber tyre, it will give a good handling, ride comfort and driving stability to the driver. Thus the steel cord is preferably used for reinforcing belt ply of rubber tyre, such as the tyre of passenger car, bus or truck.

Due to the oval steel wires as core of the steel cord, the minor axis of the oval steel cord will be shorter compared with the normal steel cord with the similar structure comprising the round steel wires. Thus the rubber ply embedded with such steel cord will be thinner. On the other hand the consumption of rubber to produce the rubber product with the same function will be reduced.

BRIEF DESCRIPTION OF FIGURES IN THE DRAWINGS

MODE(S) FOR CARRYING OUT THE INVENTION

A round steel wire can be made as follows:

The wire rod composition has a minimum carbon content of 0.60%, a maximum carbon content of about 1.10%, a manganese content ranging from 0.40% to 0.70%, a silicon content ranging from 0.15% to 0.30%, a maximum sulphur content of 0.03%, a maximum phosphorus content of 0.30%, all percentages being percentages by weight. Usually there are only traces of copper, nickel, aluminium, titanium, and nitrogen and/or chromium, except for very high tensile strengths.

The wire rod is firstly cleaned by mechanical descaling and/or by chemical pickling in a H2SO4 or HCl solution in order to remove the oxides present on the surface. The wire rod is then rinsed in water and is dried. The dried wire rod is then subjected to a first series of dry drawing operations in order to reduce the diameter until a first intermediate diameter.

At this first intermediate diameter, e.g. at about 3.0 to 3.5 mm, the dry drawn steel wire is subjected to a first intermediate heat treatment, called patenting. The steel wire is then ready for further mechanical deformation.

Thereafter the steel wire is further dry drawn from the first intermediate diameter until a second intermediate diameter in a second number of diameter reduction steps. The second diameter typically ranges from 1.0 mm to 2.5 mm.

At this second intermediate diameter, the steel wire is subjected to a second patenting treatment to allow for transformation to pearlite.

After this second patenting treatment the steel wire is provided with a brass coating: copper is plated on the steel wire and zinc is plated on the copper. A thermo-diffusion treatment is applied to form the brass coating.

Additionally the steel wire may be provided with an organo functional silane coating upon the brass coating.

Then steel wire is subjected to a final series of cross-section reductions by means of wet drawing machines. The final product is a round steel wire with a carbon content above 0.60 percent by weight, with a tensile strength typically above 2000 Mpa and adapted for the reinforcement of rubber products.

The round steel wires adapted for reinforcing tyre typically have a final diameter ranging from 0.10 mm to 0.60 mm, e.g. from 0.20 mm to 0.40 mm. Examples of wire diameters are 0.20 mm, 0.22 mm, 0.245 mm, 0.28 mm, 0.30 mm, 0.32 mm, 0.35 mm, 0.38 mm, 0.40 mm.

Then one round steel wire goes through one or more adapted forming profile dies to obtain an oval steel wire.

Figure 1:
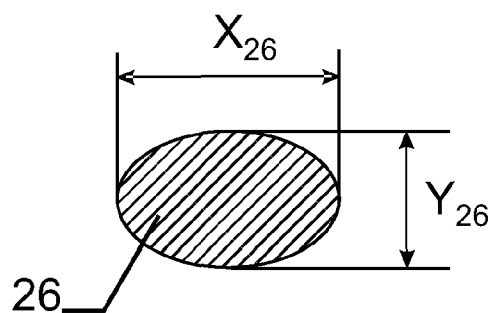
FIG. 1 shows a sectional view of an oval steel wire.

FIG. 1 illustrates the oval steel wire 26. It has a major axis X26 and minor axis Y26. The ratio Rax of X26 and Y26 is 1.33.

Figure 2:
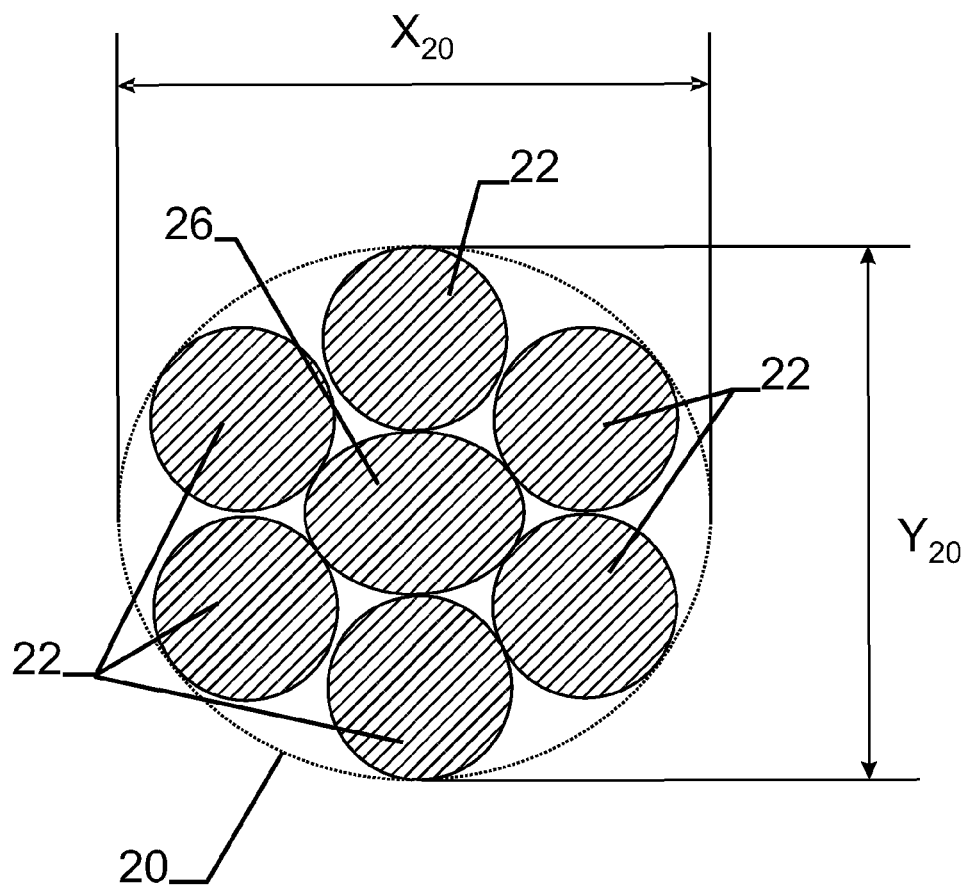
FIG. 2 shows a sectional view of an oval steel cord with a structure of 1+6 comprising an oval wire as core and round wire as outer layer.

FIG. 2 illustrates the first embodiment of an oval steel cord 20 comprising oval steel wire 26 as core and round steel wires 22 as outer layer. The major axis of the oval steel wire 26 is 0.40 mm and the minor axis is 0.30 mm. The diameter of the steel wire 22 is 0.33 mm. The major axis of the steel cord 20 is X20 and the minor axis is Y20. The ratio of X20 and Y20 is 1.104.

The manufacture process of the steel cord 20 is: twist the six round steel wires 22 around the oval steel wire 26 remaining the oval steel wire 26 being untwisted. This twisting may be done by means of a so-called double-twisting machine or buncher. The spool for supplying the oval steel wire 26 is located outside the two flyers of the machine. The oval steel wire 26 is unwound and is travelling along the first flyer where it receives two times a twist in a first direction (e.g. S-direction). The spools of the six round steel wires are located inside the cradle of the buncher. The six round steel wires 22 are unwound from their spools and are guided around the oval steel wire 26. The oval steel wire 26 with the six round steel wires 22 are then travelling along the second flyer where they all receive two times a twist in a second direction opposite to the first direction (e.g. Z-direction). The result is that we have a steel cord with an untwisted oval steel wire 26 as core, since the S-twists are compensated by the Z-twists.

Figure 3:
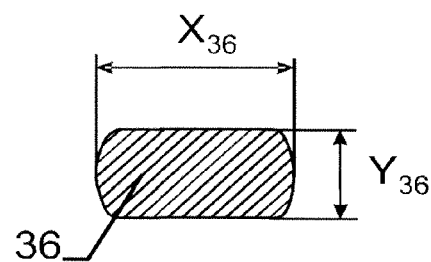
FIG. 3 shows a sectional view of a flat steel wire.

FIG. 3 illustrates a prior steel wire 36 with a flat cross-section. The flat steel wire 36 is flattened from round steel wire A which is the same steel wire to form the oval steel wire 26. The major axis of the steel wire is X36 while the minor axis is Y36. The ratio of the X36 and Y36 is 1.34.

A comparison test between the oval steel wire 26 and the flat steel wire 36 is carried out, and the following Table 1 summarizes the result.

TABLE 1

|  | Major axis/ minor axis | Fatigue resistance (cycles) | Tensile strength (Mpa) |
| --- | --- | --- | --- |
| Oval steel wire 26 | 1.33 | 13622 | 2307 |
| Flat steel wire 36 | 1.34 | 9788 | 2204 |
| Round steel wire A | 1 | 11456 | 2325 |

From the Table 1, it is obvious that the oval steel wire 26 has the better fatigue resistance and the tensile strength than the flat steel wire 36. The oval wire is more suitable for reinforcing rubber product than flat steel wire.

Figure 4:
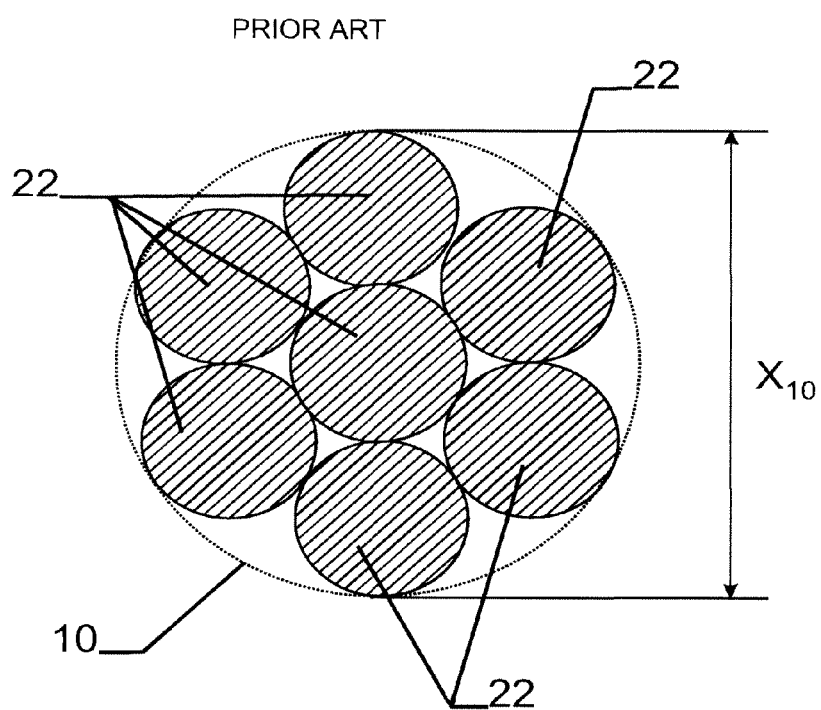
FIG. 4 shows a sectional view of a round steel cord with a structure of 1+6 comprising round wires.

FIG. 4 illustrates a prior commercially available steel cord 10 comprising round steel wires 22. It has a structure of 1+6. The diameter of the steel wire 22 is 0.33 mm. Both the major axis and minor axis of the steel cord 10 is X10 for the steel cord 10 is round.

Another prior art steel cord B with the structure of 1+6 comprising one flat wire 36 as core and six round wires 22 as outer layer. The outer layer wires 22 are twisted around the core wire 36 compactly.

Compared with prior art steel cord 10 and steel cord B, some properties of the invention steel cord 20 are measured, and the results are summarized in the following Table 2.

TABLE 2

|  | Invention steel cord 20 | Prior art steel cord 10 | Prior art steel cord B |
| --- | --- | --- | --- |
| major axis/minor axis | 1.104 | 1 | 1.106 |
| breaking load | 1.007 | 1 | 1.005 |
| linear density | 0.954 | 1 | 0.961 |
| stiffness along the major axis/stiffness along the minor axis | 1.126 | 1 | 1.130 |
| end per decimetre | 1 | 1 | 1 |
| rubber ply weight | 0.95 | 1 | 0.96 |
| Fatigue resistance (cycles) | 69759 | 74349 | 56548 |

According to the above Table 2, it is obvious that the invention steel cord 20 has the better properties than the prior art steel cord 10. Especially the stiffness, to the prior steel cord 10, there is no difference between the major axis and the minor axis, thus there is no difference between the stiffness along the major axis and the stiffness along the minor axis. But to the invention steel cord 20, there is a great difference between the stiffness along the major axis and the minor axis. It will take an advantage of good handling, ride comfort and driving stability to the driver while the steel cord is used for reinforcing rubber tyre.

Otherwise the rubber ply weight reinforced by the invention steel cord 20 is smaller than it reinforced by the prior steel cord 10. In other words, it saves a lot of rubber material while using the invention steel cord 20 to be the reinforcement.

Also according to the above Table 2, it is obvious that the invention steel cord 20 has the better fatigue resistance than the prior art steel cord B. It will take a good advantage to the final product, i.e. rubber tyre. In other words, the service life of the steel cord 20 with oval wire as core is longer than the prior art steel cord B with flat wire as core.

A second embodiment of the invention is an oval steel cord with a structure of 2+8. The two core wires are oval steel wires, and the ratio of the major axis and the minor axis Rax is 1.51. The two oval wires are untwisted and aligned in parallel, and the eight round steel wires are twisted around the two oval wires.

A third embodiment of the invention is an oval steel cord with a structure of 1+9. The core wire is an oval steel wire with a ratio of major axis and minor axis Rax of 1.18. The nine round steel wires are twisted around the oval steel wire leaving the oval steel wire being untwisted.

A fourth embodiment of the invention is an oval steel cord with a structure of 3+9. The three core wires are oval steel wires, and the ratio of the major axis and the minor axis Rax is 1.98. The three oval wires are untwisted and aligned in parallel, and the nine round steel wires are twisted around the three oval wires.

The invention claimed is:

1. A steel cord having a carbon content above 0.60% for reinforcing rubber products, said steel cord with an oval cross-section having a structure of m+n, said m being the number of the core wires (26) and ranging from 1 to 4, said n being the number of the outer layer wires (22) and ranging from 4 to 15, wherein said core wire (26) is untwisted while m is 1 or said core wires (26) are untwisted and aligned in parallel while m is between 2 and 4, said outer layer wires (22) are twisted around said core wires (26), said core wires (26) has an oval cross-section, and said outer layer wires (22) have a round cross-section, said wires in said steel cord have carbon content not less than 0.60%.

2. A steel cord as claimed in claim 1, characterized in that said oval cross-section of the core wire (26) has a major axis and a minor axis, and the ratio of said major axis and said minor axis Rax satisfies: 1.00<Rax≦2.50.

3. A steel cord as claimed in claim 2, characterized in that said Rax ranges from 1.05 to 1.50.

4. A steel cord as claimed in claim 2, characterized in that said major axis of the oval core wire (26) ranges from 0.10 mm to 0.60 mm.

5. A steel cord as claimed in claim 4, characterized in that said major axis of the oval core wire (26) ranges from 0.30 mm to 0.45 mm.

6. A steel cord as claimed in claim 1, characterized in that the diameter of said outer layer wire (22) ranges from 0.10 mm to 0.60 mm.

7. A steel cord as claimed in claim 6, characterized in that said diameter of said outer layer wire (22) ranges from 0.20 mm to 0.40 mm.

8. A steel cord as claimed in claim 1, characterized in that said core wires (26) and outer layer wires (22) are brass coated steel wires.

9. A steel cord as claimed in claim 8, characterized in that said core wires (26) and outer layer wires (22) furthermore have an adhesion promoting coating upon the brass coating.

10. A steel cord as claimed in claim 9, characterized in that said adhesion promoting coating comprises an organo functional silane.

11. A steel cord as claimed in claim 1, characterized in that said m ranges from 1 to 2.

12. A steel cord as claimed in claim 11, characterized in that said m is 1.

13. A steel cord as claimed in claim 1, characterized in that said n ranges from 5 to 10.

14. Use of a steel cord as claimed in claim 1, characterized in that said steel cord is used for reinforcing belt of rubber tyre.

\* \* \* \* \*